May 9, 1939.  A. L. STOWELL  2,158,024

COILABLE MEASURING RULE

Filed Feb. 13, 1937

Inventor
AUSTIN L. STOWELL

By T. Clay Lindsey
Attorney

Patented May 9, 1939

2,158,024

UNITED STATES PATENT OFFICE 2,158,024

COILABLE MEASURING RULE

Austin L. Stowell, New Britain, Conn., assignor to The Stanley Works, New Britain, Conn., a corporation of Connecticut Application February 13, 1937, Serial No. 125,530

9 Claims. (Cl. 33—138)

This invention relates to coilable measuring rules of the type having a casing and a measuring tape adapted to be wound therein into an externally wound coil, the tape being in the form of a strip of metal having a bent transverse form (for example, a concavo-convex cross section) so that it will resist bending and will, when extended, automatically assume a rectilinear state or a straight rod-like form. The invention has more particular reference to a rule of "push-pull" character wherein the tape may be wound into a coil within a casing by exerting a longitudinal thrust on the extended portion of the tape; pulled out of the casing by exerting a pulling force on the extended portion of the tape; and automatically maintained in any extended position, all without the use of provision of manual winding means, spring winding means, ratchets, or other manipulative devices for controlling or effecting the winding and unwinding operation.

The aim of the invention is to provide a rule of this type and character which is simple in construction; which provides an equally easy and smooth action during winding and unwinding operations; which will permit the rule being entirely withdrawn from the casing; and which will allow the rule being wound within the casing in either direction.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing wherein is shown, for illustrative purposes, several embodiments which the present invention may take:

Figure 4:
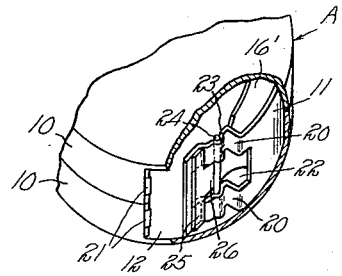
Fig. 4 is a detailed view showing, in perspective, the manner in which the spring fingers of Fig. 3 are anchored in place.
Figure 5:
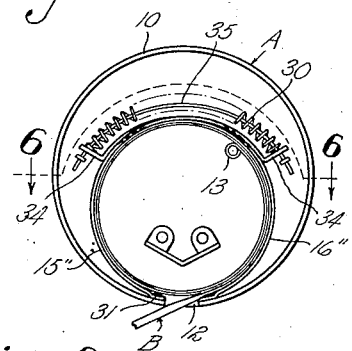
Fig. 5 is a view similar to Fig. 1 and showing still another embodiment.

Referring to the drawing in detail, A denotes the casing which may be of any suitable construction, the same being shown in the embodiments of Figs. 1 and 2 and 5 to 7 as comprising two cup shaped members 10 the open end of one of which is enlarged so as to telescopically receive the open end of the other. In the embodiment shown in Figs. 3 and 4, the cup members 10 fit about a band or liner 11. In each instance, the peripheral wall of the casing is provided with a transverse opening or entrance slot 12 for accommodating the tape. The tape, generally designated by the character B, is of the type described in the patents to H. A. Farrand No. 1,402,589 granted January 3, 1922, and No. 1,730,199 granted October 1, 1929. This tape is in the form of a metallic ribbon having a concavo-convex cross section and sufficiently flexible to be rolled or coiled; its stiffness and resiliency permitting it to assume a rectilinear state when unrestricted. When a rule of this character is freely bent longitudinally, its cross section form at its bent portion is changed from an arcuate to a flat, and the bent portion assumes a longitudinal curvature the radius of which generally corresponds to the radius of the arc of the cross sectional form of the rule in its extended form. In order to facilitate initial entry of the rule into the casing, the end of the rule which goes into the casing first and which ordinarily bears the highest scale mark is rendered more easily bendable or flexible, as described in the F. A. Volz Patent No. 1,983,503 granted December 4, 1934. If desired, this end of the rule may be provided with a relatively tight roll 13 (as indicated in Fig. 5) of sufficiently small diameter to pass through the entrance slot.

In accordance with the present invention, there is provided within the casing A a retainer comprising a pair of curved, thin sheet metal arms or fingers anchored at opposite sides of the entrance slot 12 and extending in opposite directions from said slot and with their free ends in overlapping relation, the arrangement and construction being such that, as the measuring tape is pushed into the casing, it is caused to take a coiled form, and as the coil is built up the retainer expands, and as the tape is unwound the retainer will contract, the retainer exerting at all times such contact with the outermost convolution of the coiled portion of the tape as to prevent the coil from automatically unwinding.

Figure 1:
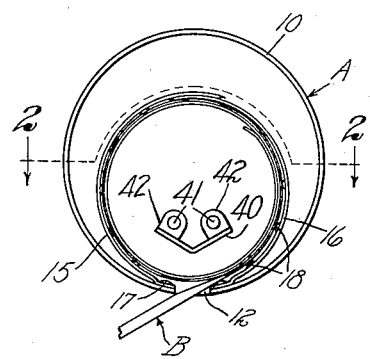
Figure 1 is a side view of a measuring rule constructed in accordance with the present invention, the measuring tape being shown as partially wound within the casing, and one-half of the casing being removed.
Figure 2:
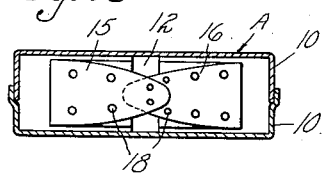
Fig. 2 is a transverse sectional view taken substantially on line 2—2 of Fig. 1.

Referring in particular to the embodiment shown in Figs. 1 and 2, the fingers or arms 15 and 16 are generally in the form of resilient particylindrical fingers secured, as by means of rivets 17, to the peripheral wall of the casing at opposite sides of the entrance slot 12. The fingers form a contractible and expansible and generally cylindrical guide for the tape. In order to reduce friction between the outer surface of the outermost convolution of the tape and the concaved faces of the fingers and minimize snubbing action between the parts, the concave faces of the fingers are provided with small bumps or nibs 18.

Within the casing and opposed to the entrance slot is a V-shaped member 40 or director for directing the inner end of the tape, when initially inserted into the casing, at the proper angle into engagement with one of the fingers, depending in which direction the tape is to be wound up, it being observed that in the absence of such a director it would be possible to insert the inner end of the tape radially into the casing, in which event some difficulty may be experienced in causing the tape to take the proper coiled form. The member 40 may be fastened to a side casing wall by rivets 41 passing through bent over ears 42 on said member, as shown in Figs. 1 and 5.

With the arrangement so far described, it will be observed that the inner end of the tape may be inserted through the slot to be brought into engagement with either of the fingers, thus permitting the tape to be wound up in either direction. When the inner end of the tape engages one of the fingers, it will ride therealong and be caused to take a curved form corresponding generally to the longitudinal curvature of the tape when freely bent, it being clear that when the tape is so longitudinally bent it will assume a straight transverse form. On continued movement of the tape into the casing, the fingers will cause the first several convolutions of the coil to assume a generally predetermined diameter, and thereafter as the tape is pushed further into the casing the tape will be wound up in a series of successive convolutions. The fingers will, of course, expand or spring outwardly so as to accommodate the coil as it is built up. The resiliency and pressure of the fingers and coil is such that the tape may be readily coiled by gripping the extended portion of the tape and pushing it towards the entrance slot. Also, the resiliency and pressure of the fingers will maintain the coil in a quiescent state while the tape is not being pushed into or pulled out of the casing. Obviously, as the tape is pulled out of the casing the fingers will contract, thus maintaining their engagement against the tape. It may be stated here that it has been proposed to provide a retainer in the form of a C spring anchored at one end. Such arrangement has been found objectionable in that as the tape is pushed into the casing a snubbing action results due to the fact that the tape tends to wind up the C spring, and a greater effort is necessary to push the tape into the casing than is required during the unwinding operation. With my improved arrangement, the snubbing action is reduced. More particularly, assuming that the tape is being coiled in the direction indicated in Fig. 1, only the right-hand finger 16 tends to exert a snubbing action, and during the unwinding operation, only the left-hand finger 15 tends to have a snubbing action. The result is that the tape may be wound up with the same smooth and easy action with which it is unwound. The bumps or nibs on the fingers also reduce the snubbing action.

Figure 3:
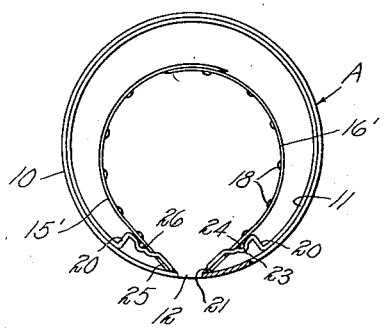
Fig. 3 is a view similar to Fig. 1 but showing another embodiment of the invention.

Referring now to the embodiment shown in Figs. 3 and 4, the fingers 15' and 16' are generally similar to, and perform the same functions as, the fingers 15 and 16 of the preceding embodiment. In this case, however, the fingers are anchored in place by the band 11 which is in the form of a split resilient ring. The ring is adapted to expand into engagement with the peripheral wall of the casing, and the split in the ring registers with the entrance slot in the casing. The ends of the band are bent to form portions 20 which are inclined inwardly of the casing and away from the entrance slot. The front and rear edges of the entrance slot are provided with inturned lips 21 against which the ends of the band are adapted to engage so that relative rotation between the cups 10 and the band is prevented. The ends of the band are slotted as at 22 so as to accommodate the anchored ends of the fingers, and the inclined portions 20 are provided with grooves 23 for accommodating pins 24. Each of the fingers 15' and 16' has, at its anchored end, a cross head 25 and a neck portion 26.

In assembling the parts, the heads 25 of the fingers may be slipped through the respective slots 22 and then the fingers turned about their major axes so as to bring them to the position shown in the drawings. The band may then be sprung into one of the cup members 10, and the pins 24 may then be slipped into place. The other cup member may then be telescoped over the band. It is clear that the head of each finger is positioned between an inclined portion 20 of the band and the peripheral wall of the casing so that that end of the finger cannot move. The pin prevents the band from moving outwardly into the slot 22 and, in effect, constitutes a fulcrum, so to speak.

Figure 7:
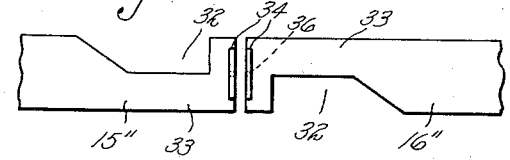
Fig. 7 is a detail view showing the construction of the relatively free ends of the spring fingers of the device shown in Figs. 5 and 6.
Figure 6:
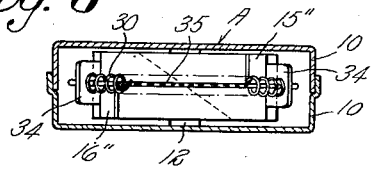
Fig. 6 is a sectional view taken substantially on line 6—6 of Fig. 5.

In the embodiment shown in Figs. 5, 6, and 7, the fingers 15'' and 16'' are associated with a coiled compression spring 30. In this embodiment, the fingers or arms may be secured, as by means of rivets 31, to the peripheral wall of the casing at opposite sides of the entrance slot. The other or relatively free ends of the fingers are in crossed overlapping relation; that is to say, the end of each finger is positioned externally of the other finger. As shown most clearly in Fig. 7, the finger 15'', adjacent its free end and at one side, is cut away as at 32 to substantially one-half the width of the finger, and the other finger 16'' is similarly cut away at the opposite edge. The notch or cutaway portion 32 of one finger accommodates the reduced or neck portion 33 of the other finger. The extreme free ends of the fingers are provided with outstanding lugs or ears 34. These ears constitute abutments for the ends of the spring 30. In order to hold the spring in position with respect to the ears, a guide wire 35 is provided. This wire passes through the coiled compression spring 30 and has its ends projecting through apertures 36 in the ears 34.

It is clear that, with the arrangement shown in Figs. 5, 6, and 7, the fingers may be of thin resilient metal as in the preceding embodiments and the compression spring 30 cooperates with the fingers in such manner as to normally cause the fingers to contract. The resiliency of the retainer comprising the fingers and the coiled spring is such as to permit the tape to be coiled up into the casing and withdrawn therefrom in a manner similar to that described in connection with the preceding embodiments.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a rule of the character described, a resilient measuring tape having a transverse curvature and an inherent tendency to assume a rectilinear state, a casing having an entrance slot through which said tape is moved, and a circular retainer within the casing comprising oppositely disposed expansible and contractible fingers extending radially inwardly from each side of the entrance slot and forming a generally circular guide for the tape whereby the tape may be wound up in either direction within the casing.

2. In a rule of the character described, a resilient measuring tape having a transverse curvature and an inherent tendency to assume a rectilinear state, a casing having an entrance slot through which said tape is moved, and spring means within the casing comprising resilient spring fingers forming a generally circular expansible and contractible guide for the tape, said fingers extending in opposite directions of rotation from the entrance slot to permit the tape to be wound up in either direction of rotation within the casing.

3. In a rule of the character described, a resilient measuring tape having a transverse curvature and an inherent tendency to assume a rectilinear state, a casing having an entrance slot through which said tape is moved, and a retainer within said casing comprising expansible and contractible spring fingers forming a generally cylindrical guide substantially encircling the coiled portion of the tape, said fingers being adapted to move generally radially of the casing and engage the outermost convolution of the coiled tape, one of said fingers being disposed to one side of said entrance slot and extending away from said slot in one direction of rotation and another of said fingers being disposed to the opposite side of said slot and extending from said slot in the opposite direction of rotation whereby to permit the tape to be wound up in either direction within the casing.

4. In a rule of the character described, a resilient measuring tape having a transverse curvature and an inherent tendency to assume a rectilinear state, a casing having an entrance slot through which said tape is moved, a retainer within the casing comprising expansible and contractible fingers forming a generally circular guide for the tape and arranged to permit the tape to be wound up in either direction within the casing, and means within the casing arranged adjacent, and in opposed relation, to said slot for guiding the inner end of the tape as it is pushed into the casing into proper relation with said fingers.

5. In a rule of the character described, a resilient measuring tape having a transverse curvature and an inherent tendency to assume a rectilinear state, a casing having an entrance slot through which said tape is moved, a retainer within said casing comprising expansible and contractible spring fingers forming a generally cylindrical guide substantially encircling the coiled portion of the tape, said fingers being adapted to move generally radially of the casing and engage the outermost convolution of the coiled tape, one of said fingers being disposed to one side of said entrance slot and projecting from said slot in one direction and another of said fingers being disposed to the opposite side of said slot and extending from said slot in the opposite direction whereby to permit the tape to be wound up in either direction within the casing, and a V-shaped member within said casing and having its apex disposed adjacent, and in opposed relation, to the central portion of the slot for directing the inner end of the tape when initially inserting it into the casing into proper relation with said fingers.

6. In a rule of the character described, a resilient measuring tape having a transverse curvature and an inherent tendency to assume a rectilinear state, a casing having an entrance slot through which said tape is moved, and a retainer within the casing comprising a pair of curved arms anchored at opposite sides of the entrance slot and extending in opposite directions from said slot and with their free ends overlapping, said arms forming a generally cylindrical guide which substantially encircles the coiled portion of the tape.

7. In a rule of the character described, a resilient measuring tape having a transverse curvature and an inherent tendency to assume a rectilinear state, a casing having an entrance slot through which said tape is moved, a split band within said casing and having its ends disposed to opposite sides of said entrance slot, means preventing relative movement of the band and casing and a retainer within said casing comprising a pair of curved arms anchored in place by said band at opposite sides of the entrance slot, said arms extending in opposite directions of rotation from said slot and having their free ends overlapping to form a generally cylindrical guide which substantially encircles the coiled portion of the tape.

8. In a rule of the character described, a resilient measuring tape having a transverse curvature and an inherent tendency to assume a rectilinear state, a casing having an entrance slot through which said tape is moved, a split, resilient band fitting within said casing and having its ends disposed to opposite sides of said entrance slot, the end portions of said band being inclined inwardly away from said slot and being provided with elongated openings, and a pair of generally parti-cylindrical flexible spring fingers each provided at one end with a neck terminating in a head, said heads being positioned between the ends of said band and the peripheral wall of the casing and said necks extending through said elongated openings whereby said fingers are anchored at opposite sides of said entrance slot, said fingers extending in opposite directions from said slot and having their inner ends in overlapping relation whereby to provide a generally ring-like retainer adapted to contract and expand radially as the coiled portion of the tape is built up and reduced in diameter.

9. In a rule of the character described, a resilient measuring tape having a transverse curvature and an inherent tendency to assume a rectilinear state, a casing having an entrance slot through which said tape is moved, a retainer within said casing for causing the measuring tape to take a coiled form as it is pushed into the casing and for maintaining the coil and comprising a pair of curved fingers anchored at opposite sides of said entrance slot and extending in opposite directions from said slot, said fingers having their free ends in crossed and overlapping relation, the extreme ends of said fingers having outwardly extending lugs, and a compression spring interposed between and abutting at its opposite ends against said lugs.

AUSTIN L. STOWELL.